(12) United States Patent
Henn et al.

(10) Patent No.: US 7,497,722 B2
(45) Date of Patent: Mar. 3, 2009

(54) SPACE-OPTIMIZED SENSOR CONNECTOR

(75) Inventors: Rálf Henn, Gomaringen (DE); Holger Scholzen, Stuttgart (DE); Frank Henning, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 11/177,155

(22) Filed: Jul. 7, 2005

(65) Prior Publication Data
US 2006/0019547 A1 Jan. 26, 2006

(30) Foreign Application Priority Data
Jul. 8, 2004 (DE) .................. 10 2004 032 984

(51) Int. Cl.
*H01R 3/00* (2006.01)
(52) U.S. Cl. .................. 439/488; 439/350; 439/352
(58) Field of Classification Search ................ 439/289, 439/349, 350, 352, 913, 488
See application file for complete search history.

(56) References Cited

U.S. PATENT DOCUMENTS

| 4,924,701 | A | * | 5/1990 | Delatorre | 73/152.52 |
| 4,964,809 | A | * | 10/1990 | Jobson | 439/357 |
| 5,123,856 | A | * | 6/1992 | Brinkmann | 439/289 |
| 5,823,801 | A | * | 10/1998 | Elkhatib | 439/83 |
| 6,290,524 | B1 | * | 9/2001 | Simmel | 439/289 |
| 6,322,386 | B1 | * | 11/2001 | Tharp et al. | 439/344 |
| 6,585,544 | B2 | * | 7/2003 | Furutani | 439/852 |
| 6,899,568 | B2 | * | 5/2005 | Caines | 439/660 |
| 7,044,751 | B2 | * | 5/2006 | Takanashi et al. | 439/76.2 |
| 2003/0162431 | A1 | * | 8/2003 | Schmidt et al. | 439/350 |
| 2004/0137777 | A1 | * | 7/2004 | Fukuda | 439/349 |

* cited by examiner

*Primary Examiner*—Tho D Ta
*Assistant Examiner*—Travis Chambers
(74) *Attorney, Agent, or Firm*—Kenyon & Kenyon LLP

(57) ABSTRACT

A sensor system includes a sensor element and a body. A number of electrical contact points with which contact may be created via electrical contact elements are provided on one side of the sensor element. Electrically conductive insertion parts are introduced into the body made of a non-conductive material and create a contact with the electrical contact points of the sensor element when the sensor element and the body are mechanically joined together.

11 Claims, 4 Drawing Sheets

SPACE-OPTIMIZED SENSOR CONNECTOR

BACKGROUND INFORMATION

Sensor elements are used to measure pressure and temperature. In internal combustion engines, for example, pressure is measured in annular spaces using high pressure sensors which are electrically connected to a central engine control unit. Nowadays, the electrical connections are designed as wire bonds which create the connection to an electronic analyzer, e.g., in the central engine control unit. Due to the further miniaturization of the sensor elements used, e.g., high pressure sensors, space inside the sensor housing is subject to significant constraints, to ensure that the bond wires can be applied.

Various assembly and connection methods are used in the assembly of high pressure sensors. After a sensor element has been mounted on a threaded connection piece in a permanently locked manner, the sensor element's electrical connections to the electronic analyzer are created via wire bonds. Herein, the bond surfaces via which the wire bonds contact the sensor element must have the same orientation as the wire bonds and must be very close to one another. In particular, the orientation of the bond surfaces presents a problem if space inside the sensor housing of the sensor element is subject to significant constraints.

In assembly and connection methods used heretofore, e.g., for creating electrical contacts for high pressure sensor elements, a welded connection only is implemented on the underside of the sensor element, so as to create a mechanical connection to the sensor as a whole, i.e., the sensor element's housing. As a general rule, the sensor element's electrical contact is created on the front side, using bond wires. This known assembly method has among other things the disadvantage that when the bond connection is created it has to be possible to access the contact surfaces, namely the contact pads, from the outside, and the sensor housing is not mountable until the bond connection has been created. Furthermore, it is not possible to simultaneously create an electrical connection via wire bonds as well as a mechanical connection between the sensor element and its surrounding sensor housing; instead, a series of assembly steps are required.

SUMMARY OF THE INVENTION

According to the present invention, it is possible to create not only an electrical but also a mechanical basic connection between a sensor element such as a high pressure sensor element and the PCB of an electronic analyzer even at increased temperatures and if space is subject to significant constraints.

According to the present invention, use is made of the geometry of the sensor element so that it is possible to simultaneously create an electrical as well as a mechanical connection from the sensor element to the PCB of an electronic analyzer. To accomplish this, the outer surfaces, in particular the collar necessary for processing the sensor element in a workpiece holder and an accompanying protrusion on the collar, are used to precisely orient the sensor element in the housing. The sensor element is joined together with a plug body that serves as the housing. Using a plug body that serves as the housing makes it feasible to sub-assemble the subcomponents separately before assembly, the mechanical and electrical connection being created simultaneously when they are plugged together. This assembly sequence may be used for example when integrating a pressure sensor into a sheathed-element glow plug, the plug body along with the PCB and the electronic analyzer as part of the system as a whole being joined together with a pressure sensor element, and the contact being thereby simultaneously created. This procedure significantly reduces the complexity of the assembly process.

A non-conductive body made via a one- or two-component injection molding process includes one or a plurality of electrically conductive insertion parts. The insertion parts are designed as wires and create the electrical connection between the contact pads on the front side of a sensor element and a PCB of an electronic analyzer. On the sensor side, the insertion parts, which are designed as wires that are introduced into the non-conductive body, may include curved flexible elements which make contact with the contact pads on the sensor element's front side when the sensor element is pressed into the non-conductive body that functions as the housing. In order to improve the contact, the curved and flexible ends of the wire bonds may optionally be treated with a conductive material such as solder or adhesive, so that if necessary the curved bond wires and the respective contact pads are joined in a permanently locked manner by applying heat.

The opposite ends of the insertion parts, which are designed as wires, may be connected via conductors to a PCB of the electronic analyzer, or may also be designed as plug connectors. In addition, the insertion parts which are introduced into the non-conductive body may also be connected to a wire harness. By shaping one or a plurality of insertion parts inside the body made of non-conductive material, it is possible in particular to modify the position and orientation of the arrangement of the contact pads on the front side of the sensor element and with regard to the printed conductor tracks on the PCB. This enables the requirement that the contact pads have the same orientation, as is required for example with wire bonds, to be met. This means that using the means of achieving the object according to the present invention the sensor element and the PCB may be oriented independently of one another within a sensor housing.

The mechanical connection between the body made of non-conductive material and the sensor element may be created by pressing the sensor element into the body made of non-conductive material, which serves as a plug. Herein, the upper side of a collar on the sensor element comes to rest against a corresponding mating surface, so that the surface of the collar rests against the body made of non-conductive material. In order to fix the sensor element in this position, mating projections may reach up against the underside of the sensor element collar. These mating projections are flexible and may be part of the body made of non-conductive material. To ensure better stability, the mating projections may in addition be encircled by a spring washer, which surrounds the mating projections of the sensor element when it has been mounted in the plug body and thus ensures that the sensor element is held firmly in the body made of non-conductive material. The mating projections may be used to hold the sensor element and to maintain the spring tension in the conductors in the curved wire-like ends of the insertion parts when contact with the contact pads has been created.

To ensure that the orientation of the conductor of one or a plurality of insertion parts complements the orientation of the sensor element, a protrusion, which fits into a corresponding indentation in the body made of non-conductive material to ensure that rotation does not take place, may be provided in the collar of the sensor element. This prevents any rotation, and also ensures that the respective conductors are correctly assigned.

DETAILED DESCRIPTION

Figure 1:
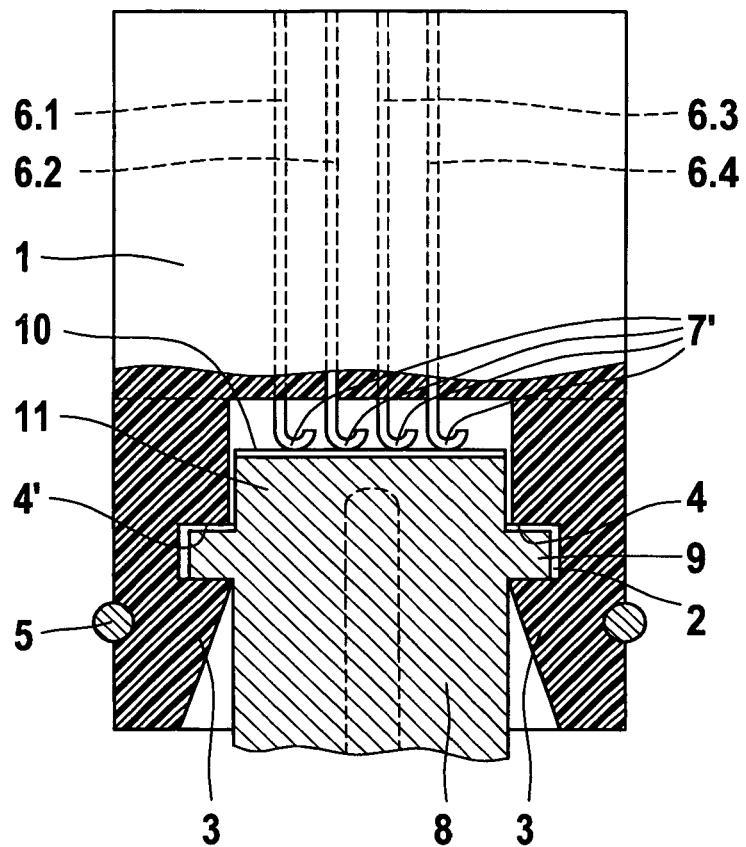
FIG. 1 shows a cross section of the body made of non-conductive material, the sensor element having been inserted into it.

FIG. 1 shows a cross section through the body made of non-conductive material, the sensor element having been inserted. Body 1, which is made from non-conductive material preferably via a one- or two-component injection molding process, includes a recess 2, into which a sensor element 8, e.g., a pressure sensor element, is insertable. On the lower side of recess 2, one or a plurality of mating projections 3 are provided, which reach up against the underside of a collar 9 on sensor element 8 and hold it against a stop surface 4 of body 1 made of non-conductive material. In the area of mating projections 3, body 1 is encircled by a spring washer 5, which pre-tensions mating projections 3, thus ensuring sensor element 8 is held firmly in place in body 1 made of non-conductive material.

As shown in FIG. 1, a plurality of insertion parts 6.1, 6.2, 6.3 and 6.4 designed as wires are introduced into body 1 made of non-conductive material. Insertion parts 6.1, 6.2, 6.3 and 6.4 have flexible-element-like curved sections 7 on their ends facing a front face 10 of sensor element 8 which are in contact with contact pads (not shown in FIG. 1) on front face 10 of sensor element 8. Collar 9 of sensor element 8 rests against stop surface 4 of body 1 made of non-conductive material, as already mentioned. Between the upper side of collar 9 and front face 10 of sensor element 8 there is a support section 11, the upper side of which is delimited by front face 10 having the contact pads. When sensor element 8 has been mounted in body 1 made of non-conductive material, the part of recess 2 not occupied by sensor element 8 is only penetrated by the flexible ends of insertion parts 6.1, 6.2, 6.3 and 6.4, thus ensuring an effective contact with sensor element 8.

Figure 2:
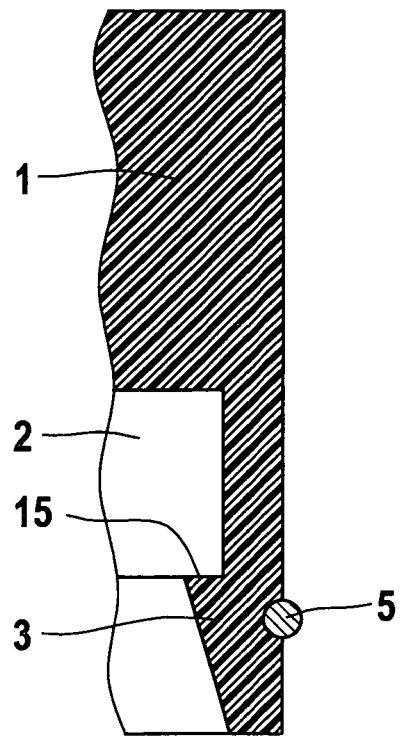
FIG. 2 shows a section of the body made of non-conductive material, showing the mating projections.

FIG. 2 shows a section of the body made of non-conductive material, and clearly shows the mating projections.

Below recess 2, mating projection 3 shown in FIG. 2 has a protrusion 15. Because recess 2 is provided in body 1 made of non-conductive material, mating projection 3 possesses elasticity. If protrusion 15 reaches up against the underside of collar 9 on sensor element 8, mating projection 3 is pre-tensioned by spring washer 5 on the outer surface of body 1 made of non-conductive material and as a result is pressed against the outer edge of sensor element 8. This ensures that sensor element 8 is fixed firmly in place in body 1 made of non-conductive material and cannot slip out.

Figure 3:
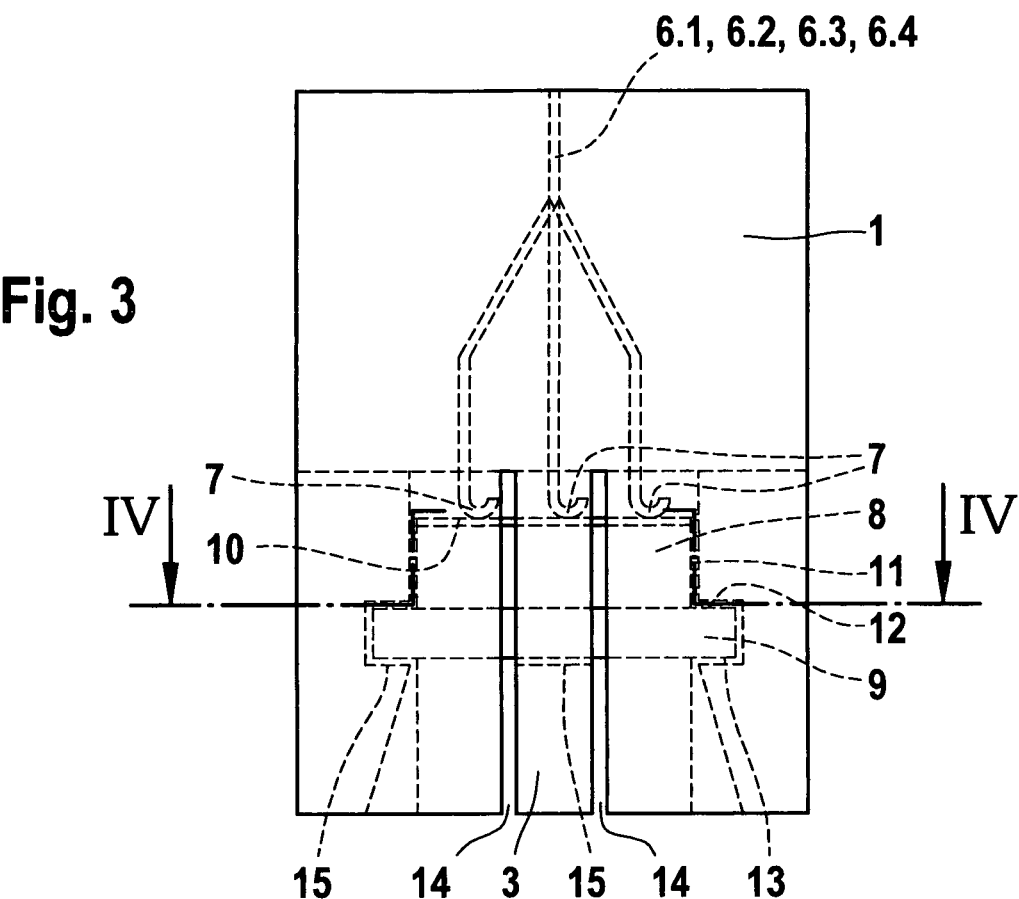
FIG. 3 shows an external view of the body made of non-conductive material, showing the mating projections.

FIG. 3 shows an outside view of the body made of non-conductive material, and clearly shows the arrangement of the mating projections.

FIG. 3 shows that mating projection 3 is defined by slit-shaped openings 14 in body 1 made of non-conductive material. Spring washer 5 which encircles mating projections 3 below collar 9 is not shown in FIG. 3. Protrusion 15 (shown as broken lines) on the inside of mating projection 3 (see also FIG. 2) reaches up against an underside 13 of collar 9 of sensor element 8. In FIG. 3 sensor element 8 is shown using broken lines.

Figure 4:
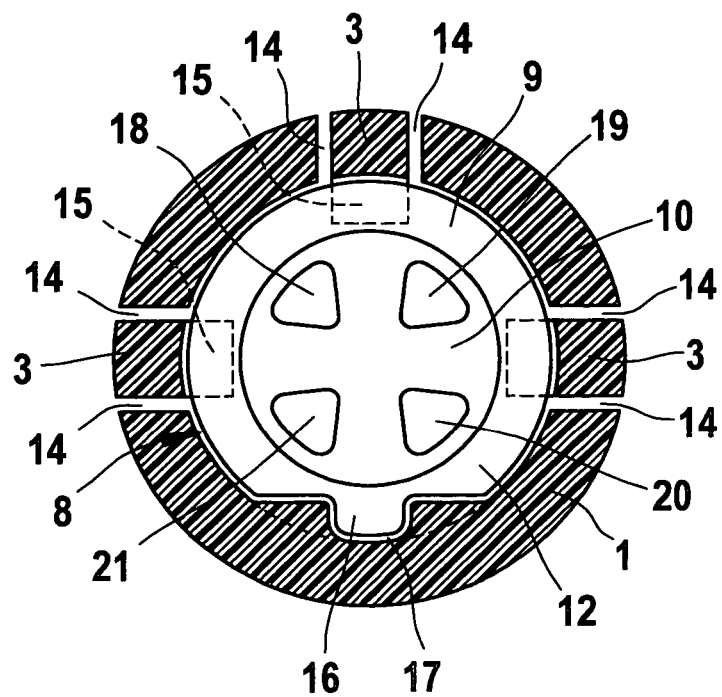
FIG. 4 shows a top view of the body made of non-conductive material into which the sensor element has been integrated, showing the arrangement of the mating projections and the arrangement of the protrusion in the collar of the sensor element.

As shown in FIG. 4, a plurality of mating projections 3 may be provided on the outer edge of body 1 made of non-conductive material. Front side 10 of sensor element 8 having a plurality of contact pads based on the number of wire-like insertion parts 6.1, 6.2, 6.3, 6.4 with which contact is to be created lies beneath curved ends 7 of aforementioned insertion parts 6.1, 6.2, 6.3 and 6.4. The configuration of insertion parts 6.1, 6.2, 6.3 and 6.4, which may be cast into body 1 made of non-conductive material, may correspond to the shape of a wire harness or may constitute a parallel conductor arrangement. As can be seen from FIG. 3, mating projections 3 constitute an integral part and extend in a horizontal direction in body 1 made of non-conductive material.

FIG. 4 shows a top view of a sensor element which is fixed in place in the body made of non-conductive material, and also shows the arrangement of the mating projections and the means for preventing rotation.

As shown in FIG. 4, mating projections 3 may be oriented at for example 90° relative to one another. In FIG. 3 there are three mating projections 3 in body 1 made of non-conductive material, but it is also feasible for body 1 made of non-conductive material to have two or four or more mating projections 3, which would then be oriented at appropriate angles relative to the outer edge of body 1 made of non-conductive material.

In the arrangement shown in FIG. 4, protrusions 15 (shown as broken lines), which are arranged on each respective mating projection 3, reach up against the underside of collar 9 of sensor element 8. Reference numbers 14 indicate the slit-shaped openings on either side of each mating projection 3 which allow the necessary elasticity and allow collar 9 to be pushed into recess 2 of body 1 made of non-conductive material from below. To ensure this is possible, mating projections 3 have an oblique expansion section below protrusions 15.

A first contact pad 18, a second contact pad 19, a third contact pad 20, and a fourth contact pad 21 are located on front face 10 of sensor element 8. The number of contact pads 18, 19, 20 and 21 located on front face 10 of sensor element 8 varies according to the number of insertion parts 6.1, 6.2, 6.3 and 6.4 embedded in body 1 made of non-conductive material. As shown in FIG. 4, protrusions 15 of three mating projections 3 reach up against the underside of collar 9 on sensor element 8. To ensure that sensor element 8 cannot be rotated within body 1 made of non-conductive material, a lug-shaped protrusion 16 is provided, which fits into a recess 17 in body 1 made of non-conductive material. Another technical means for preventing rotation is to provide a flattened area on the outer radius or to provide a groove thereon. In such an instance, the geometry of body 1 made of non-conductive material complements the geometry of sensor element 8 in question. This keeps sensor element 8 from being rotated within body 1 made of non-conductive material, thus ensuring that insertion parts 6.1, 6.2, 6.3 and 6.4 which are electrically assigned to contact pads 18, 19, 20, 21 are always in contact with the correct contact pads 18, 19, 20, 21. Contact pads 18, 19, 20, 21 arranged on front face 10 of sensor element 8 make contact with curved ends 7 of insertion parts 6.1, 6.2, 6.3 and 6.4 when sensor element 8 is pressed into body 1 made of non-conductive material. To improve the contact, curved ends 7 of insertion parts 6.1, 6.2, 6.3 and 6.4 may be treated with a conductive material such as fusible solder or an adhesive so that when heat is applied curved ends 7 of insertion parts 6.1, 6.2, 6.3 and 6.4 and contact pads 18, 19, 20 and 21 in question may be joined in a permanently locked manner.

Figure 5:
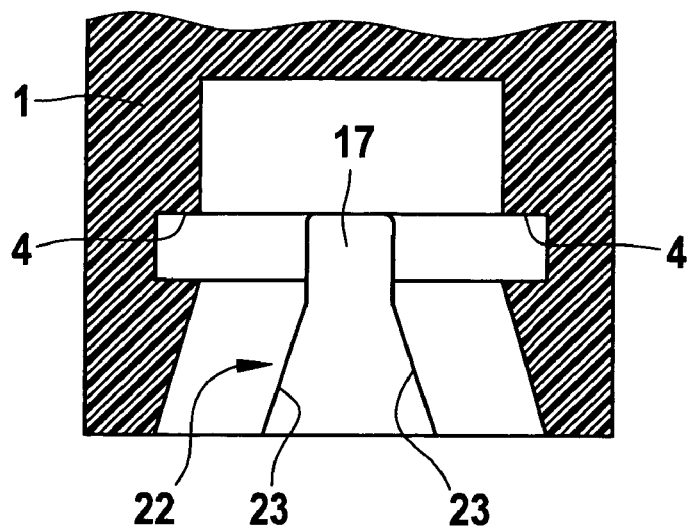
FIG. 5 shows a section of the body made of non-conductive material, showing the indentation for preventing rotation.

FIG. 5 shows a section of the body made of non-conductive material, showing how rotation is prevented.

Stop surface 4 is provided in the outer shell of body 1 made of non-conductive material and rests against upper side 12 of collar 9 of sensor element 8. Lug-shaped protrusion 16 of sensor element 8 shown in FIG. 4 is surrounded by recess 17 in body 1 made of non-conductive material. To facilitate the joining together of sensor element 8 and body 1 made of non-conductive material, the insertion area of recess 7 is funnel-shaped, as indicated by reference number 22. The flanks which delimit funnel-shaped insertion opening 22 are indicated by reference numbers 23. In FIG. 5 mating projections 3 of body 1 made of non-conductive material are not shown.

Figure 6:
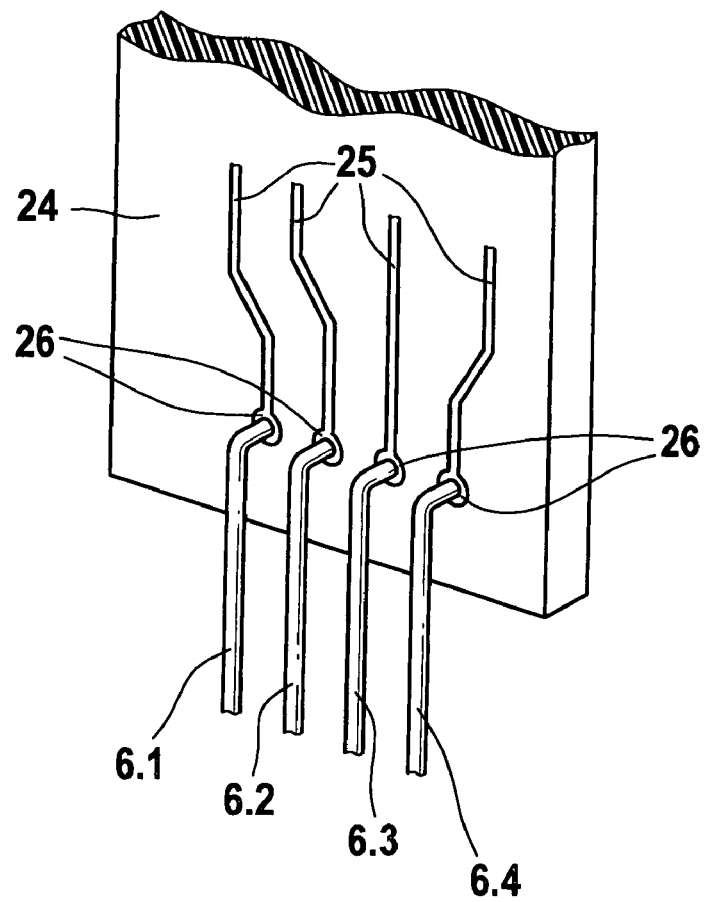
FIG. 6 shows an exemplary embodiment for contacting the PCB of an electronic analyzer.

FIG. 6 shows an exemplary embodiment of contact with a PCB of an electronic analyzer.

Various printed conductor tracks 25 are provided on a PCB 24, which is a component of an electronic analyzer. Each printed conductor track 25 is electrically connected via a corresponding connection point 26 to a respective insertion part 6.1, 6.2, 6.3 or 6.4. Connection points 26 may be designed as solder bumps or plug connectors or similar. In FIG. 6, insertion parts 6.1, 6.2, 6.3 and 6.4 are designed as individual wires. However, insertion parts 6.1, 6.2, 6.3 and 6.4 may equally be part of a wire harness structure or some other arrangement of conductors. In FIG. 6 insertion parts 6.1, 6.2, 6.3 and 6.4 are shown as cut off, i.e., the section of insertion parts 6.1, 6.2, 6.3 and 6.4 which is embedded in or has been cast in body 1 made of non-conductive material is not shown in further detail.

Figure 7:
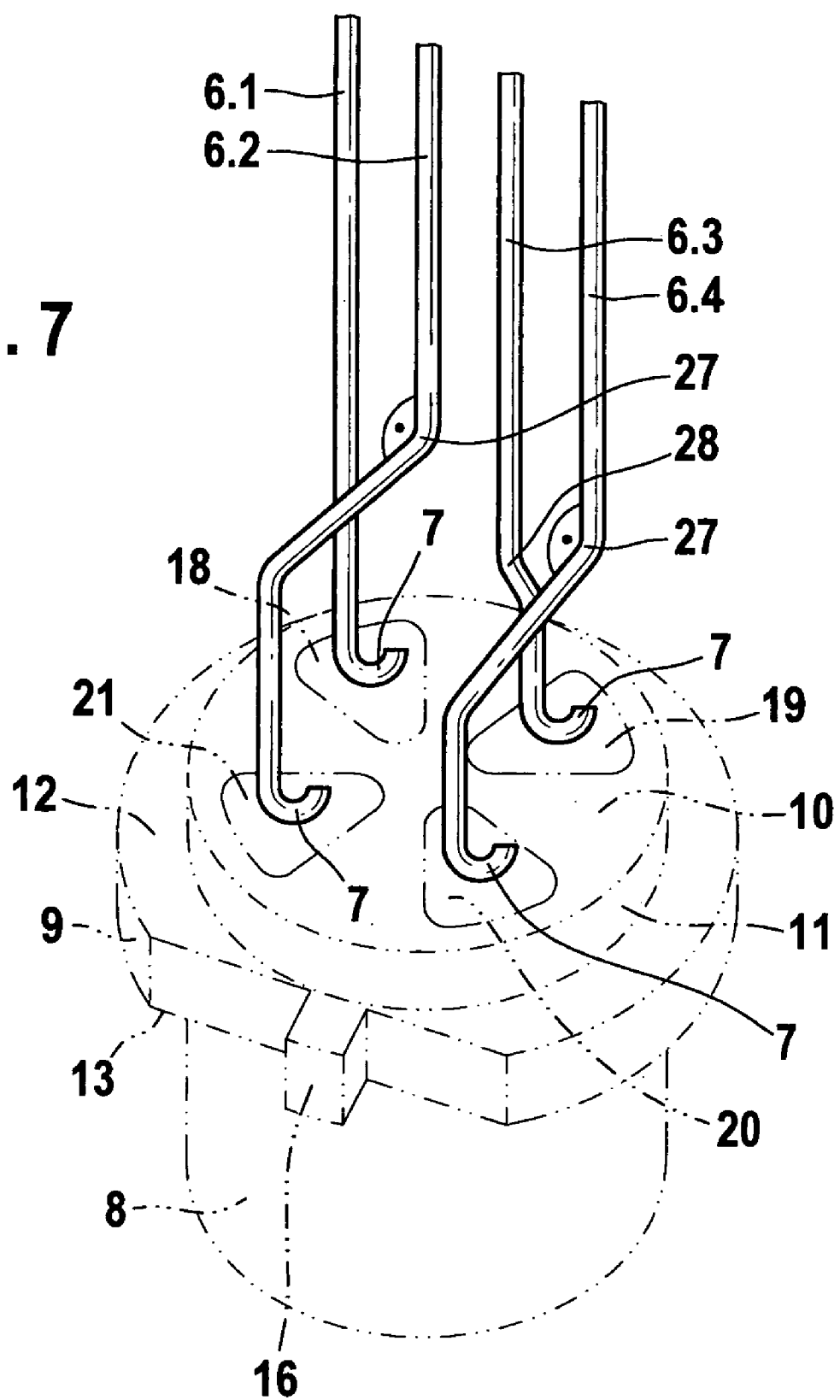
FIG. 7 shows how contact is created between the sensor element and the flexible elements on the ends of the conductors of the insertion parts.

FIG. 7 shows how contact is created between the sensor element and the flexible elements on the curved conductor ends of the insertion parts.

In FIG. 7, for the sake of clarity, body 1 made of non-conductive material is not shown. FIG. 7 shows that contact is created between curved ends 7 of insertion parts 6.1, 6.2, 6.3 and 6.4 and first contact pad 18, second contact pad 19, third contact pad 20, and fourth contact pad 21 on front face 10 of sensor element 8. Depending on the space available, for example first insertion part 6.1 may be essentially straight. Second insertion part 6.2 may have a first bend 27 of for example 90° so that it is able to reach fourth contact pad 21. Insertion part 6.3 has a second bend 28 which is roughly S-shaped so that it is possible to create contact between second contact pad 19 and wire-like third insertion part 6.3. In a similar manner to second insertion part 6.2, wire-like fourth insertion part 6.4 may have a first bend 27, of for example 90°. The fact that individual insertion parts 6.1, 6.2, 6.3 and 6.4 have varying geometries ensures that wire-like individual insertion parts 6.1, 6.2, 6.3 and 6.4 do not touch one another, and also ensures that they reliably reach contact pads 18, 19, 20 or 21 assigned to the particular insertion parts 6.1, 6.2, 6.3 and 6.4. In addition to the types of embodiment of insertion parts 6.1, 6.2, 6.3 and 6.4 shown in FIG. 7, insertion parts 6.1, 6.2, 6.3 and 6.4 may of course have bends that differ from bends 27 and 28 shown in FIG. 7, this depending on the number of insertion parts 6.1, 6.2, 6.3 and 6.4 and the space available in body 1 made of non-conductive material. The shape of insertion parts 6.1, 6.2, 6.3 and 6.4 may be used in particular to closely take into account the position and orientation of the arrangement of contact pads 18, 19, 20, 21 on front face 10 of sensor element 8 as well as the position of contact points 26 on one side of PCB 24. This means sensor element 8 and PCB 24 may be housed in a sensor housing independently of one another. Instead of a PCB having an integrated electronic analyzer, a silicon chip having an electronic analyzer may be fixed directly to the front face of body 1 made of non-conductive material and contacts may be established with it directly via wire bonds based on the appropriate geometry of contact points 26.

The mechanical connection between body 1 made of non-conductive material and sensor element 8 is created by pressing sensor element 8 into recess 2 of body 1 made of non-conductive material. Herein, upper side 12 of collar 9 of sensor element 8 comes to rest against stop surface 4 which is provided on body 1 made of non-conductive material. Thus the surface of collar 9 lies against stop surface 4 of body 1 made of non-conductive material. In order to fix sensor element 8 in this position, protrusions 15 of mating projections 3 reach up against underside 13 of collar 9 and lock into position. Mating projections 3 are flexible thanks to their geometry and in particular are an integral part of body 1 made of non-conductive material. To ensure better stability and to help mating projections 3 keep sensor element 8 fixed in place in body 1 made of non-conductive material, on the outer surface of body 1 made of non-conductive material they are encircled by a spring washer 5. Spring washer 5 presses mating projections 3 and protrusions 15 provided thereon into position against underside 13 of collar 9 so that sensor element 8 is held in position in body 1 made of non-conductive material so that it cannot rotate or slip out.

It is important to note that spring washer 5 is optional. Mating projections 3 may be designed as an integral part of body 1 made of non-conductive material. Moreover, rather than having integrated mating projections on body 1 made of non-conductive material, a separate ring on which mating projections 3 are located may be provided. The geometry of mating projections 3 may also be designed differently, e.g., as a segment of the surface of a sphere or similar.

All the types of embodiment shown have the following in common: the mechanical and geometric shape of sensor element 8 is used to mechanically fix it in place in body 1 made of non-conductive material, an electrical connection being created simultaneously.

List of Reference Numerals

1 Body made of non-conductive material
2 Recess
3 Mating projection
4 Stop surface
5 Spring washer
6.1 First insertion part
6.2 Second insertion part
6.3 Third insertion part
6.4 Fourth insertion part
7 Curved end
8 Sensor element
9 Collar
10 Front face of sensor element
11 Support section
12 Upper side of collar 9

13 Underside of collar 9
14 Slit
15 Protrusion
16 Lug-shaped protrusion of sensor element 8
17 Recess in body 1
18 First contact pad
19 Second contact pad
20 Third contact pad
21 Fourth contact pad
22 Funnel
23 Flank
24 PCB
25 Printed conductor track
26 connection point
27 First bend (90°)
28 second bend (S-shaped)

What is claimed is:

1. A sensor system comprising:
a sensor element;
a body made of non-conductive material;
a plurality of electrical contact points situated on one side of the sensor element;
electrically conductive insertion parts introduced into the body;
an electrical contact element at an end of each of the electrically conductive insertion parts creating a contact with the electrical contact points of the sensor element when the sensor element and the body are mechanically joined together;
a stop surface and mating projections which position and fix the sensor element in place when it is pushed into the body and are situated in the body; and
a spring washer encircling the mating projections in the body;
wherein in a mounted state, having been inserted into the body, the sensor element is held in position by the mating projections engaging a collar of a sensor element;
and wherein in the mounted state the sensor element is kept from rotating by a device for preventing rotation.

2. The sensor system according to claim 1, wherein when the sensor element is joined together with the body it locks into position and at the same time creates an electrical contact.

3. The sensor system according to claim 1, wherein the body made of non-conductive material is one of (a) a one-component injection-molded part and (b) a two-component injection-molded part.

4. The sensor system according to claim 1, wherein the electrical contact elements contact a front face of the sensor including the electrical contact points of the sensor when the sensor element and the body are mechanically joined together.

5. The sensor system according to claim 1, wherein the electrical contact elements contact the sensor but do not enter the sensor.

6. The sensor system according to claim 1, wherein the electrically conductive insertion parts are encapsulated in the body and at least free ends of the electrical contact element are not encapsulated in the body and do not contain portions of the body between them.

7. The sensor system according to claim 1, wherein a recess having a funnel-shaped opening into which a lug-shaped protrusion of the sensor element fits is situated in the body.

8. The sensor system according to claim 1, wherein the ends of the insertion parts facing the electrical contact points are flexible.

9. The sensor system according to claim 8, wherein a conductive material, being one of a solder and an adhesive, is applied to the flexible ends of the insertion parts.

10. The sensor system according to claim 1, wherein the insertion parts introduced into the body made of non-conductive material have shaped elements which allow contact points of the insertion parts on a POB and the electrical contact points of the sensor element to be oriented independently of each other.

11. The sensor system according to claim 10, wherein the shaped elements of the insertion parts include at least one of (a) bends and (b) S-shaped bends.

* * * * *